(12) United States Patent
Trzynadlowski et al.

(10) Patent No.: US 11,886,625 B1
(45) Date of Patent: Jan. 30, 2024

(54) METHOD AND DEVICE FOR SPATIALLY DESIGNATING PRIVATE CONTENT

(71) Applicant: Apple Inc., Cupertino, CA (US)

(72) Inventors: Bart Colin Trzynadlowski, Reno, NV (US); Thomas G. Salter, Foster City, CA (US); Devin William Chalmers, Oakland, CA (US); Anshu Kameswar Chimalamarri, San Francisco, CA (US); Gregory Patrick Lane Lutter, Boulder Creek, CA (US)

(73) Assignee: APPLE INC., Cupertino, CA (US)

( * ) Notice: Subject to any disclaimer, the term of this patent is extended or adjusted under 35 U.S.C. 154(b) by 156 days.

(21) Appl. No.: 17/550,911

(22) Filed: Dec. 14, 2021

Related U.S. Application Data

(60) Provisional application No. 63/128,620, filed on Dec. 21, 2020.

(51) Int. Cl.
*G06F 21/84* (2013.01)
*G06F 21/10* (2013.01)
*G06F 21/57* (2013.01)

(52) U.S. Cl.
CPC ............. *G06F 21/84* (2013.01); *G06F 21/10* (2013.01); *G06F 21/57* (2013.01); *G06F 21/1066* (2023.08); *G06F 2221/032* (2013.01)

(58) Field of Classification Search
CPC ........... G06F 21/84; G06F 21/10; G06F 21/57
See application file for complete search history.

(56) References Cited

U.S. PATENT DOCUMENTS

| | | | | |
|---|---|---|---|---|
| 8,966,656 B2 * | 2/2015 | Hirsch | ...................... | H04L 9/12 |
| | | | | 713/168 |
| 9,323,855 B2 * | 4/2016 | Hochmuth | .............. | G06F 16/51 |
| 9,773,098 B1 * | 9/2017 | Waid | ....................... | G06F 21/10 |
| 9,818,228 B2 * | 11/2017 | Lanier | .................... | H04W 12/06 |
| 10,070,118 B2 * | 9/2018 | Baran | .................... | B41M 3/008 |
| 10,339,279 B2 * | 7/2019 | Demirli | ................. | H04W 12/02 |
| 11,106,328 B1 * | 8/2021 | Holland | .............. | G06F 21/6254 |
| 2014/0250447 A1 * | 9/2014 | Schink | ................. | H04N 21/478 |
| | | | | 725/10 |
| 2016/0012250 A1 * | 1/2016 | Demirli | ............... | H04L 12/4625 |
| | | | | 726/28 |
| 2017/0039770 A1 * | 2/2017 | Lanier | .................... | H04W 12/06 |
| 2017/0085867 A1 * | 3/2017 | Baran | .................... | B41M 3/008 |
| 2018/0241567 A1 * | 8/2018 | Walling-McGarity | ..................... | |
| | | | | H04N 21/2541 |

(Continued)

*Primary Examiner* — Viral S Lakhia
(74) *Attorney, Agent, or Firm* — Fernando & Partners, LLP

(57) ABSTRACT

In one implementation, a method for spatially designating private content. The method includes: presenting, via a display device, an indication of a private viewing region relative to a location of the computing system; determining a first location for presentation of graphical content; and presenting, via the display device, the graphical content at the first location. The method further includes: transmitting a characterization vector associated with the graphical content to at least one other device for display thereon according to a determination that the first location of the graphical content is outside of the private viewing area; and forgoing transmission of the characterization vector associated with the graphical content to the at least one other device according to a determination that the first location of the graphical content is inside of the private viewing area.

22 Claims, 14 Drawing Sheets

(56) References Cited

U.S. PATENT DOCUMENTS

2019/0102545 A1* 4/2019 Wang ................... G06F 8/61
2022/0300143 A1* 9/2022 Karafin ................ G06F 3/011

* cited by examiner

METHOD AND DEVICE FOR SPATIALLY DESIGNATING PRIVATE CONTENT

CROSS-REFERENCE TO RELATED APPLICATIONS

This application claims the benefit of U.S. Provisional Patent Application No. 63/128,620, filed on Dec. 21, 2020, which is herein incorporated by reference in its entirety.

TECHNICAL FIELD

The present disclosure generally relates to presenting content and, in particular, to systems, methods, and methods for spatially designating private content.

BACKGROUND

While in a copresence experience, a user may not wish to expose graphical content (e.g., extended reality (XR) content) to other users and to maintain privacy over some graphical content. One way to maintain privacy over graphical content includes manual designation of specific content as private based on voice commands, gestural commands, or the like. As such, in some implementations, the innovation described herein provides an alternative scheme including a spatially defined region in which graphical content is private to the user and graphical content outside of the region is publicly viewable to other users in the copresence experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
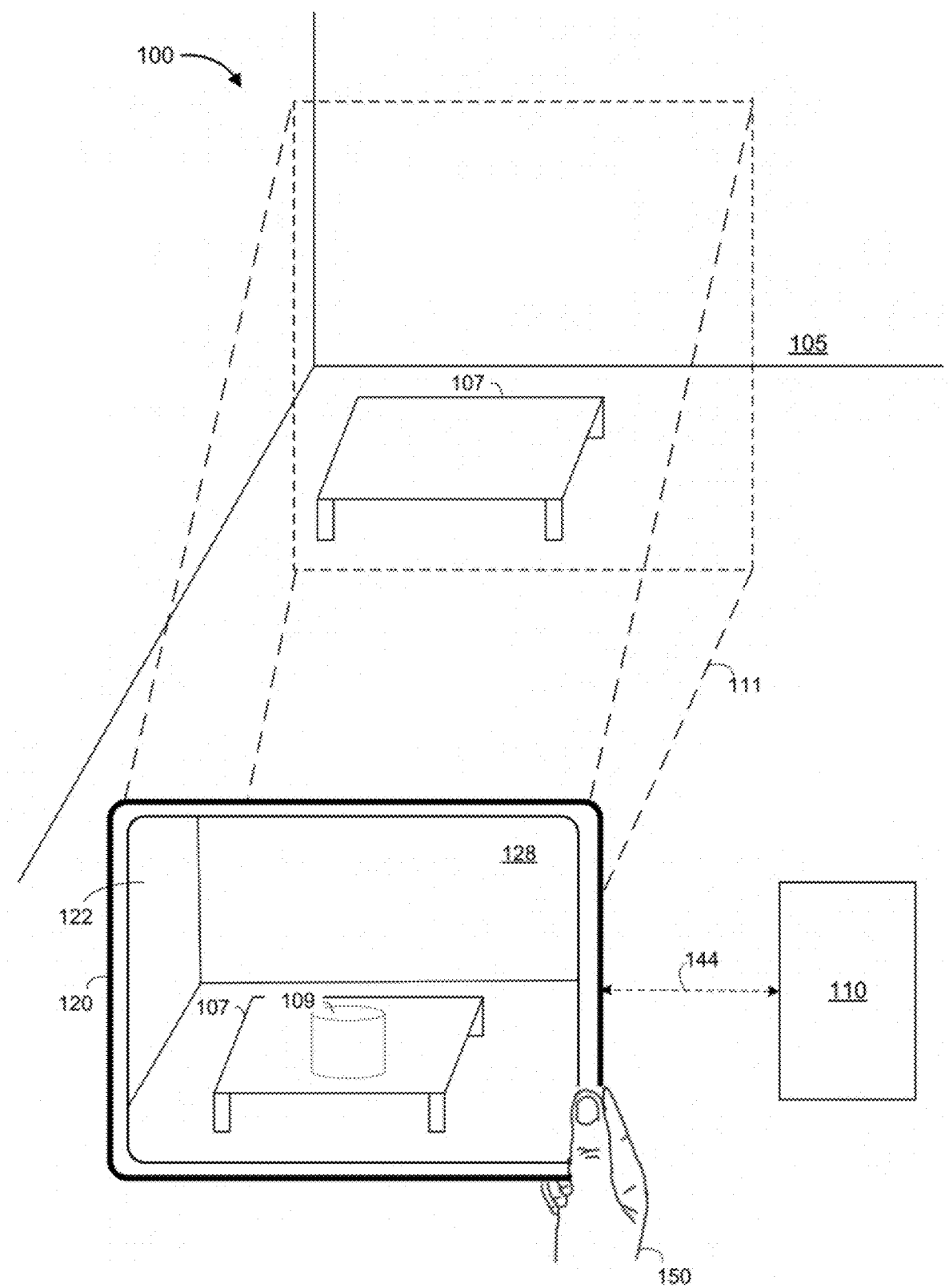
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for spatially designating private content. According to some implementations, the method is performed at a computing system including non-transitory memory and one or more processors, wherein the computing system is communicatively coupled to a display device and one or more input devices. The method includes: presenting, via the display device, an indication of a private viewing region relative to a location of the computing system; determining a first location for presentation of graphical content (e.g., extended reality (XR) content); and presenting, via the display device, the graphical content at the first location. The method further includes: transmitting a characterization vector associated with the graphical content to at least one other device for display thereon according to a determination that the first location of the graphical content is outside of the private viewing area; and forgoing transmission of the characterization vector associated with the graphical content to the at least one other device according to a determination that the first location of the graphical content is inside of the private viewing area.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. With reference to this example, as the FOV 111 changes, the XR environment 128 maintains display of the XR cylinder 109 remains displayed at its origin location on the display 122. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
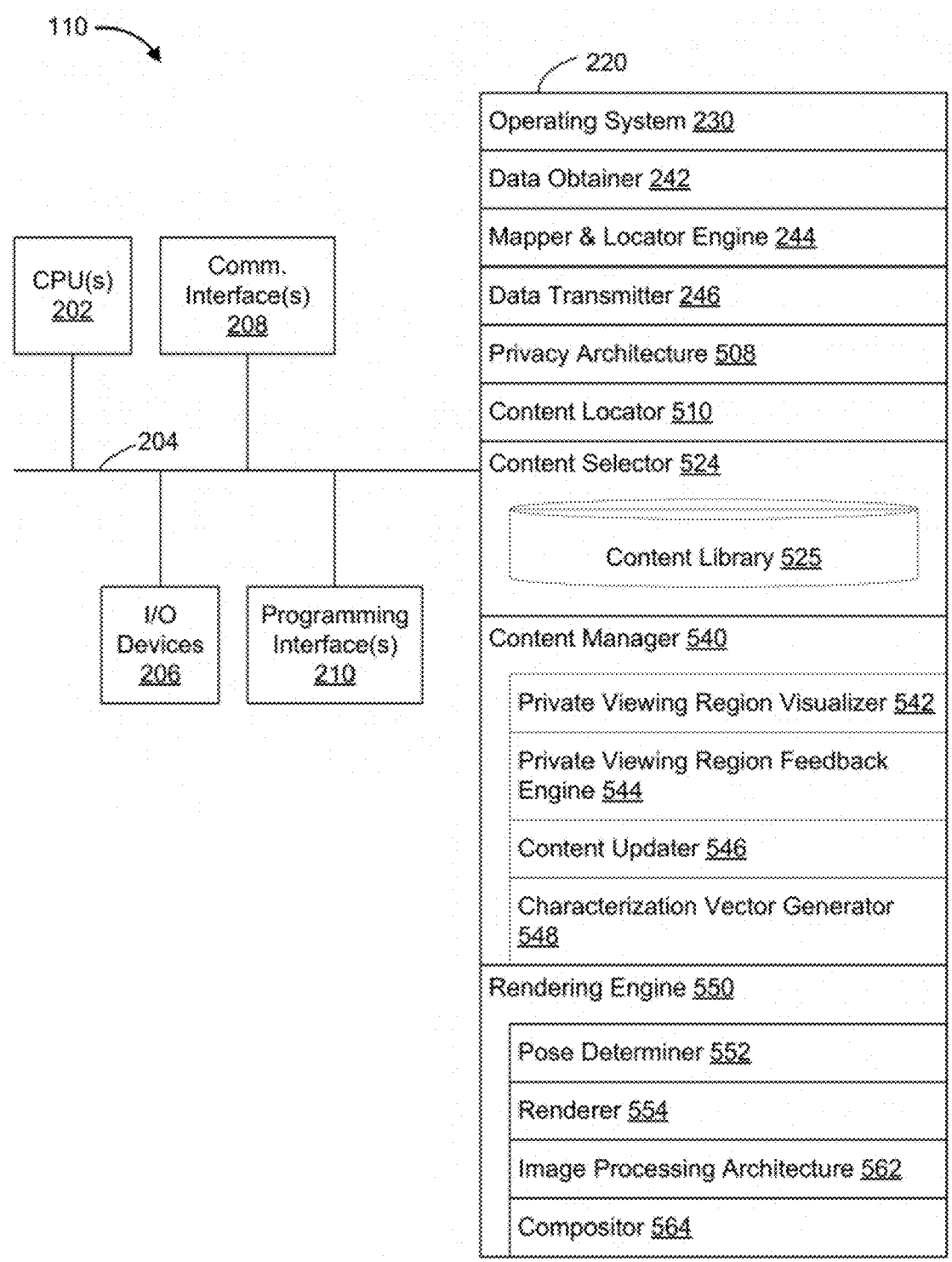
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, a characterization vector associated with the XR content, etc.) to at least the electronic device 120 and optionally one or more other devices. To that end, in various implementations, the data transmitter 246 includes instructions and/or logic therefor, and heuristics and metadata therefor.

In some implementations, a privacy architecture 508 is configured to ingest input data and filter user information and/or identifying information within the input data based on one or more privacy filters. The privacy architecture 508 is described in more detail below with reference to FIG. 5A. To that end, in various implementations, the privacy architecture 508 includes instructions and/or logic therefor, and heuristics and metadata therefor.

In some implementations, a content locator 510 is configured to determine an origin location for presentation of XR content and updated location(s) for the XR content based on user input(s) that translate the XR content. The content locator 510 is described in more detail below with reference to FIG. 5A. To that end, in various implementations, the content locator 510 includes instructions and/or logic therefor, and heuristics and metadata therefor.

In some implementations, a content selector 524 is configured to select XR content (sometimes also referred to herein as "graphical content" or "virtual content") from a content library 525 based on one or more user requests and/or inputs (e.g., a voice command, a selection from a user interface (UI) menu of XR content items, and/or the like). The content selector 524 is described in more detail below with reference to FIG. 5A. To that end, in various implementations, the content selector 524 includes instructions and/or logic therefor, and heuristics and metadata therefor.

In some implementations, the content library 525 includes a plurality of content items such as audio/visual (A/V) content and/or XR content, objects, items, scenery, etc. As one example, the XR content includes 3D reconstructions of user captured videos, movies, TV episodes, and/or other XR content. In some implementations, the content library 525 is pre-populated or manually authored by the user 150. In some implementations, the content library 525 is located local relative to the controller 110. In some implementations, the content library 525 is located remote from the controller 110 (e.g., at a remote server, a cloud server, or the like).

In some implementations, a content manager 540 is configured to manage and update the layout, setup, structure, and/or the like for the XR content selected by the content selector 524 and an indication of a private viewing region. The content manager 540 is described in more detail below with reference to FIG. 5A. To that end, in various implementations, the content manager 540 includes instructions and/or logic therefor, and heuristics and metadata therefor. In some implementations, the content manager 540 includes a private viewing region visualizer 542, a private viewing region feedback engine 544, a content updater 546, and a characterization vector generator 548.

In some implementations, a private viewing region visualizer 542 is configured to generate a visualization for the private viewing region. In some implementations, the private viewing region is centered on the electronic device 120 or the user thereof. In some implementations, the visualization of the private viewing region corresponds to a cylinder, a sphere, or another geometric shape at least partially surrounding the electronic device 120 or the user 150 thereof. In some implementations, the visualization of the private viewing region also includes text information. To that end, in various implementations, the private viewing region visualizer 542 includes instructions and/or logic therefor, and heuristics and metadata therefor.

In some implementations, a private viewing region feedback engine 544 is configured to generate sensory feedback (e.g., visual feedback such as text or lighting changes, audio feedback, haptic feedback, etc.) when user input(s) translate the XR content from inside the private viewing region to outside the private viewing region or vice versa. To that end, in various implementations, the private viewing region feedback engine 544 includes instructions and/or logic therefor, and heuristics and metadata therefor.

In some implementations, the content updater 546 is configured to modify the location of the XR content based on user input(s) that translate the XR content. In some implementations, the content updater 546 is configured to modify an appearance characteristic of the XR content based on user input(s) that change the appearance characteristic of the XR object. As one example, the content updater 546 may change a color, contrast, brightness, a size, a shape, a texture, shadows, lighting, and/or the like of the XR content based on the user input(s). As another example, the content updater 546 may add XR content portions/components to or remove XR content portions/components of the XR content based on the user input(s). In some implementations, the content updater 546 is configured to rotate the XR content based on user input(s) that rotate the XR content. To that end, in various implementations, the content updater 546 includes instructions and/or logic therefor, and heuristics and metadata therefor.

In some implementations, the characterization vector generator 548 is configured to generate a characterization vector for subject XR content or update an existing characterization vector for the subject XR content. In some implementations, the characterization vector includes a timestamp associated with the most recent update of the characterization vector, an identifier for the XR content, appearance characteristics associated with the XR content (e.g., a texture map, shadow(s), color value(s), shape, etc.), and location characteristics associated with the current location of the XR content (e.g., translational values, rotational values, etc.). In some implementations, the characterization vector optionally includes a predefined set of operations and/or actions that may be performed on the XR content and a predefined set of input modalities that be directed to the XR content such as voice commands, eye gaze commands, gestural/tap command, etc. An example characterization vector 575 is described in more detail below with reference to FIG. 5B. To that end, in various implementations, the characterization vector generator 548 includes instructions and/or logic therefor, and heuristics and metadata therefor.

In some implementations, a rendering engine 550 is configured to render an XR environment (sometimes also referred to herein as a "graphical environment" or "virtual environment") or image frame associated therewith as well as the visualization of the private viewing region. To that end, in various implementations, the rendering engine 550 includes instructions and/or logic therefor, and heuristics and metadata therefor. In some implementations, the rendering engine 550 includes a pose determiner 552, a renderer 554, an optional image processing architecture 562, and an optional compositor 564.

In some implementations, the pose determiner 552 is configured to determine a current camera pose of the electronic device 120 and/or the user 150 relative to the A/V content and/or XR content. The pose determiner 552 is described in more detail below with reference to FIG. 5A. To that end, in various implementations, the pose determiner 552 includes instructions and/or logic therefor, and heuristics and metadata therefor.

In some implementations, the renderer 554 is configured to render the A/V content and/or the XR content according to the current camera pose relative thereto. The renderer 554 is described in more detail below with reference to FIG. 5A. To that end, in various implementations, the renderer 554 includes instructions and/or logic therefor, and heuristics and metadata therefor.

In some implementations, the image processing architecture 562 is configured to obtain (e.g., receive, retrieve, or capture) an image stream including one or more images of the physical environment 105 from the current camera pose of the electronic device 120 and/or the user 150. In some implementations, the image processing architecture 562 is also configured to perform one or more image processing operations on the image stream such as warping, color correction, gamma correction, sharpening, noise reduction, white balance, and/or the like. The image processing architecture 562 is described in more detail below with reference to FIG. 5A. To that end, in various implementations, the image processing architecture 562 includes instructions and/or logic therefor, and heuristics and metadata therefor.

In some implementations, the compositor 564 is configured to composite the rendered A/V content and/or XR content with the processed image stream of the physical environment 105 from the image processing architecture 562 to produce rendered image frames of the XR environment for display. The compositor 564 is described in more detail below with reference to FIG. 5A. To that end, in various implementations, the compositor 564 includes instructions and/or logic therefor, and heuristics and metadata therefor.

Although the data obtainer 242, the mapper and locator engine 244, the data transmitter 246, the privacy architecture 508, the content locator 510, the content selector 524, the content manager 540, and the rendering engine 550 are shown as residing on a single device (e.g., the controller 110), it should be understood that in other implementations, any combination of the data obtainer 242, the mapper and locator engine 244, the data transmitter 246, the privacy architecture 508, the content locator 510, the content selector 524, the content manager 540, and the rendering engine 550 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
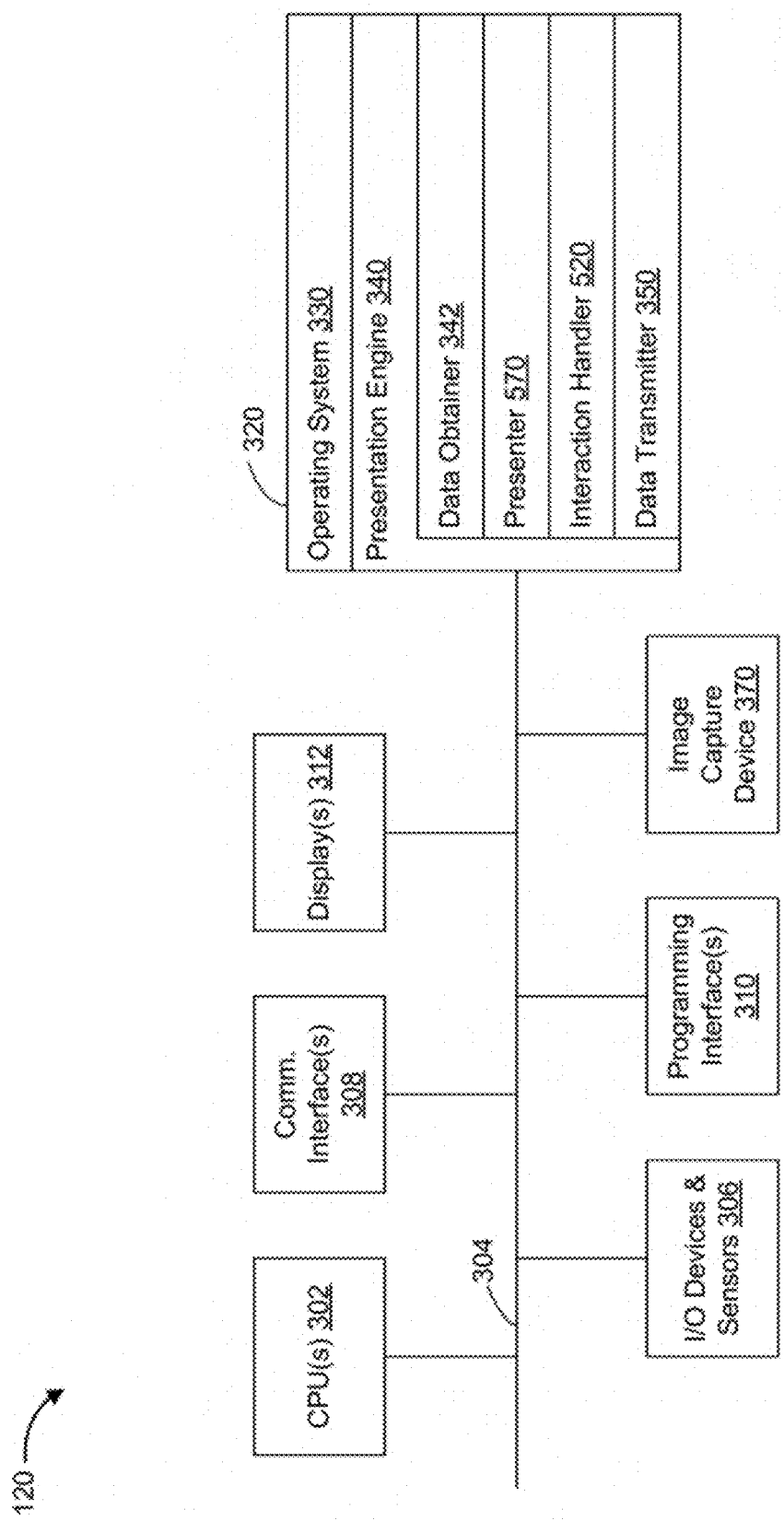
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 570, an interaction handler 520, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 570 is configured to present and update A/V content and/or XR content (e.g., the rendered image frames associated with the user interface or the XR environment including the visualization of the private viewing region) via the one or more displays 312. To that end, in various implementations, the presenter 570 includes instructions and/or logic therefor, and heuristics and metadata therefor.

In some implementations, the interaction handler 520 is configured to detect user interactions with the presented A/V content and/or XR content (e.g., gestural inputs detected via hand tracking, eye gaze inputs detected via eye tracking, voice commands, etc.). To that end, in various implementations, the interaction handler 520 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the presenter 570, the interaction handler 520, and the data transmitter 350 are shown as residing on a single device (e.g., the electronic device 120), it should be understood that in other implementations, any combination of the data obtainer 342, the presenter 570, the interaction handler 520, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
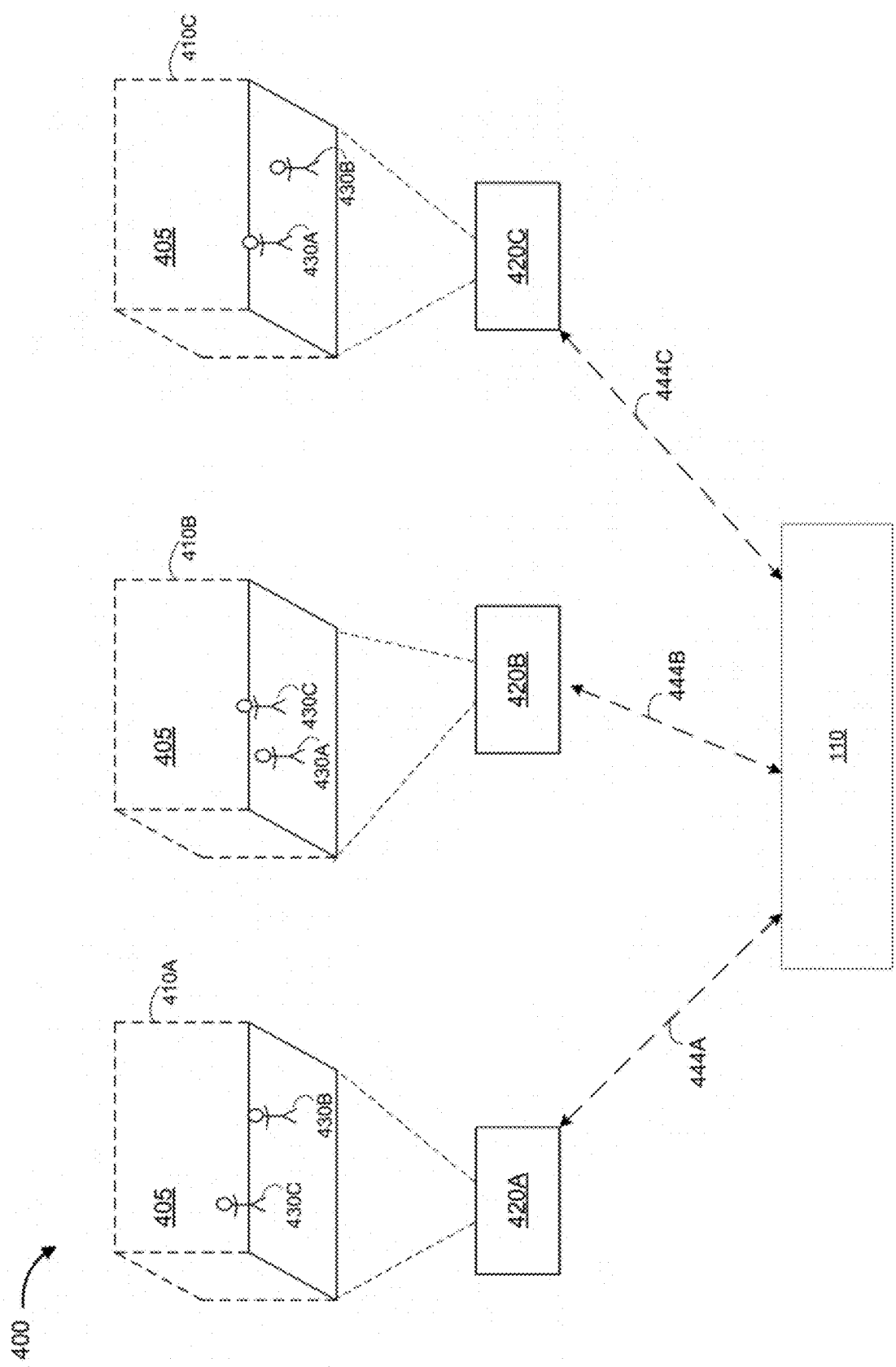
FIG. 4 is a block diagram of an example copresence XR experience in accordance with some implementations.

FIG. 4 is a block diagram of an example copresence XR experience 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 4, a first user associated with an electronic device 420A, a second user associated with an electronic device 420B, and a third user associated with an electronic device 420C participate in the copresence XR experience 400. According to some implementations the electronic devices 420A, 420B, and 420C are similar to and adapted from the electronic device 120 shown in FIGS. 1 and 3.

As shown in FIG. 4, the electronic device 420A presents a first perspective 410A of a shared XR environment 405 to a first user of the copresence XR experience 400. For example, the first perspective 410A of the shared XR environment 405 includes a second avatar 430B associated with a second user and a third avatar 430C associated with a third user. As further shown in FIG. 4, the electronic device 420B presents a second perspective 410B of shared XR environment 405 to the second user of the copresence XR experience 400. For example, the second perspective 410B of the shared XR environment 405 includes a first avatar 430A associated with the first user and the third avatar 430C associated with the third user. As further shown in FIG. 4, the electronic device 420A presents a third perspective 410C of the shared XR environment 405 to the third user of the copresence XR experience 400. For example, the third perspective 410C of the shared XR environment 405 includes a second avatar 430B associated with the second user and the first avatar 430A associated with the first user.

As shown in FIG. 4, the controller 110 coordinates the copresence XR experience 400 for multiple users by managing different perspectives 410A, 410B, and 410C of the shared XR environment 405. To that end, the controller 110 is communicatively coupled with electronic devices 420A, 420B and 420C via wired or wireless communication channels 444A, 444B, and 444C, respectively, (e.g., BLUETOOTH, IEEE 802.11x, IEEE 802.16x, IEEE 802.3x, etc.). One of ordinary skill in the art will appreciate that the controller 110 may coordinate a copresence XR experience 400 for any number of users. As one example, the shared XR environment 405 corresponds to a telepresence conference room, a video-based group chat or call system, a virtual conference space, a copresence XR experience, or the like.

As one example involving the first user, according to some implementations, the controller 110 updates the first perspective 410A of the shared XR environment 405 based on a change of the body pose and/or the head pose of the first user. As another example involving the first user, according to some implementations, the controller 110 updates the first perspective 410A of the shared XR environment 405 based on a change of location, rotation, appearance, or the like of XR content within the shared XR environment 405. According to some implementations, if one of the users manipulates or otherwise modifies XR objects and/or XR content within the shared XR environment 405, the controller 110 updates the shared XR environment 405 and, subsequently, the first perspective 410A, the second perspective 410B, and the perspective 410C of the copresence XR experience 400 accordingly.

Figure 5A:
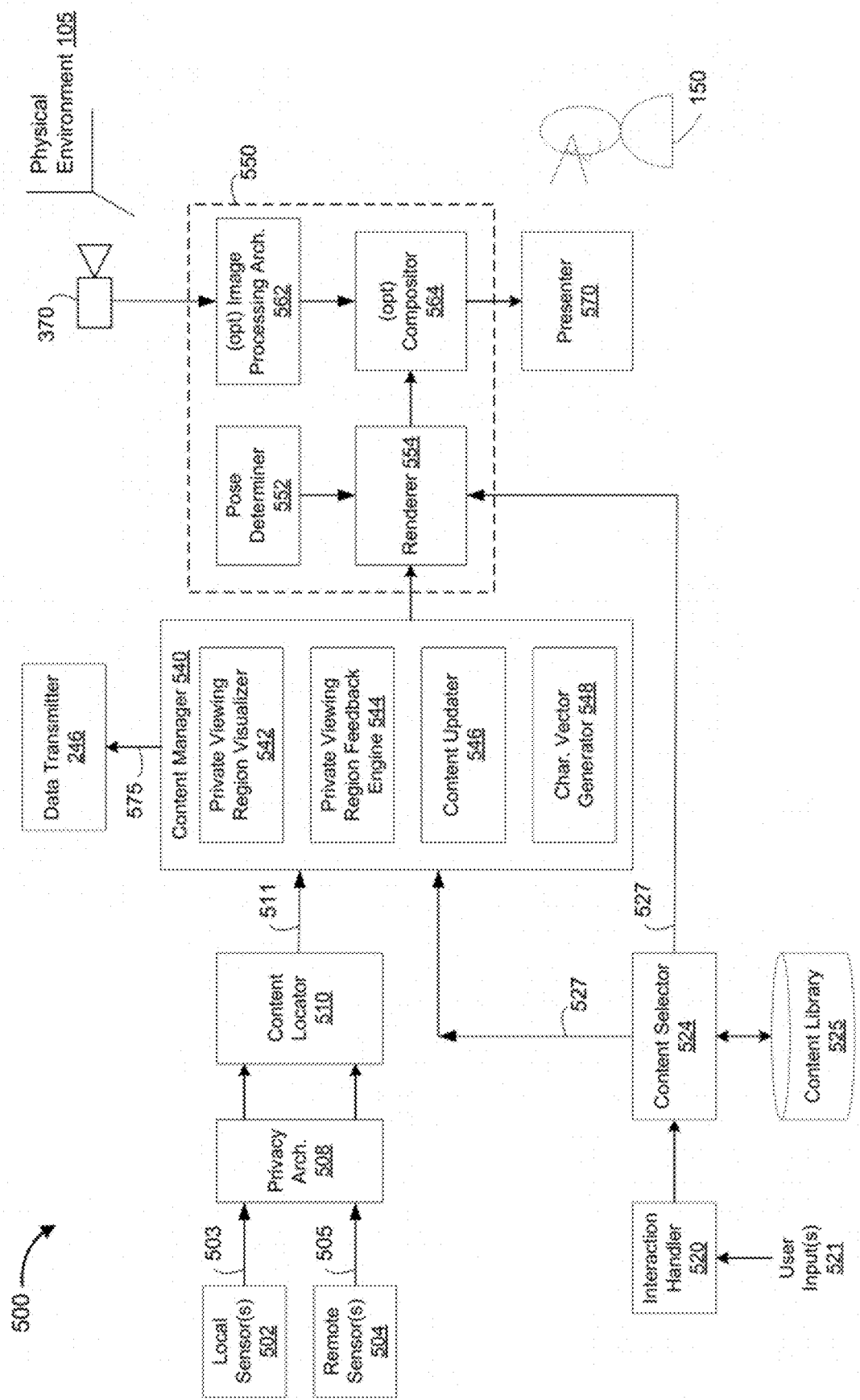
FIG. 5A is a block diagram of an example content delivery architecture in accordance with some implementations.

FIG. 5A is a block diagram of an example content delivery architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 500 is included in a computing system such as the controller 110 shown in FIGS. 1 and 2; the electronic device 120 shown in FIGS. 1 and 3; and/or a suitable combination thereof.

As shown in FIG. 5A, one or more local sensors 502 of the controller 110, the electronic device 120, and/or a combination thereof obtain local sensor data 503 associated with the physical environment 105. For example, the local sensor data 503 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 502 includes un-processed or post-processed information.

Similarly, as shown in FIG. 5A, one or more remote sensors 504 associated with the optional remote input devices within the physical environment 105 obtain remote sensor data 505 associated with the physical environment 105. For example, the remote sensor data 505 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 505 includes un-processed or post-processed information.

According to some implementations, the privacy architecture 508 ingests the local sensor data 503 and the remote sensor data 505. In some implementations, the privacy architecture 508 includes one or more privacy filters associated with user information and/or identifying information. In some implementations, the privacy architecture 508 includes an opt-in feature where the electronic device 120 informs the user 150 as to what user information and/or identifying information is being monitored and how the user information and/or the identifying information will be used. In some implementations, the privacy architecture 508 selectively prevents and/or limits content delivery architecture 500 or portions thereof from obtaining and/or transmitting the user information. To this end, the privacy architecture 508 receives user preferences and/or selections from the user 150 in response to prompting the user 150 for the same. In some implementations, the privacy architecture 508 prevents the content delivery architecture 500 from obtaining and/or transmitting the user information unless and until the privacy architecture 508 obtains informed consent from the user 150. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes. As another example, the privacy architecture 508 anonymizes certain types of user information likely to include sensitive and/or identifying information, independent of user designation (e.g., automatically).

According to some implementations, the content locator 510 obtains the local sensor data 503 and the remote sensor data 505 after it has been subjected to the privacy architecture 508. In some implementations, the content locator 510 determines a current location 511 for the XR content based on the local sensor data 503 and the remote sensor data 505. For example, the current location corresponds to an origin location for presentation of XR content or updated location(s) for the XR content based on user input(s) that translate the XR content.

According to some implementations, the interaction handler 520 obtains (e.g., receives, retrieves, or detects) one or more user inputs 521 provided by the user 150 that are associated with selecting A/V content and/or XR content for presentation. For example, the one or more user inputs 521 correspond to a gestural input selecting XR content from a UI menu detected via hand tracking, an eye gaze input selecting XR content from the UI menu detected via eye tracking, a voice command selecting XR content from the UI menu detected via a microphone, and/or the like. In some implementations, the content selector 524 selects XR content 527 from the content library 525 based on one or more user inputs 521 (e.g., a voice command, a selection from a menu of XR content items, and/or the like).

In various implementations, the content manager 540 manages and updates the layout, setup, structure, and/or the like for the XR content 527 and an indication of a private viewing region. To that end, the content manager 540 includes a private viewing region visualizer 542, a private viewing region feedback engine 544, a content updater 546, and a characterization vector generator 548.

Figure 6:
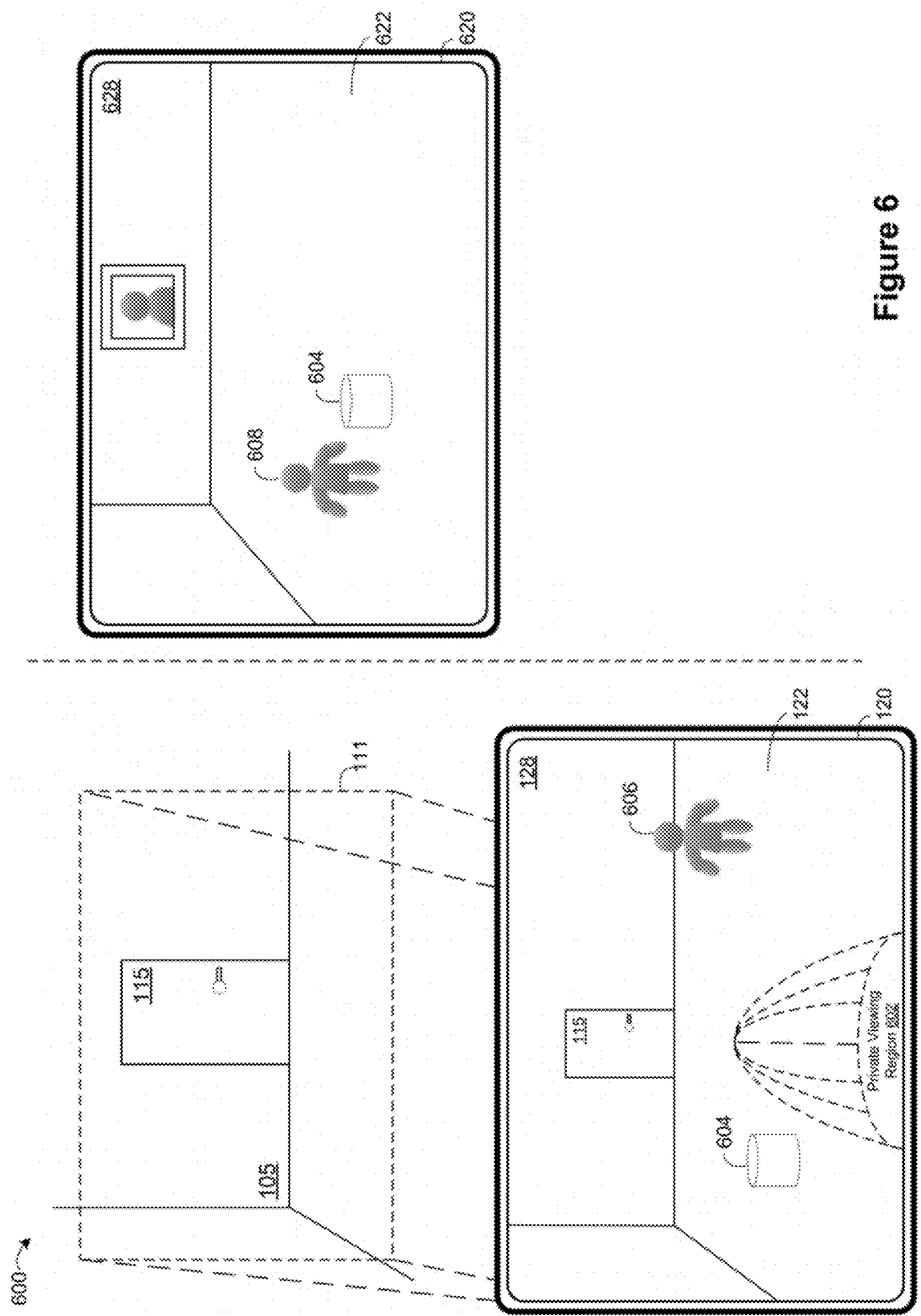
FIG. 6 illustrates an instance for a content delivery scenario in accordance with some implementations.
Figure 7A:
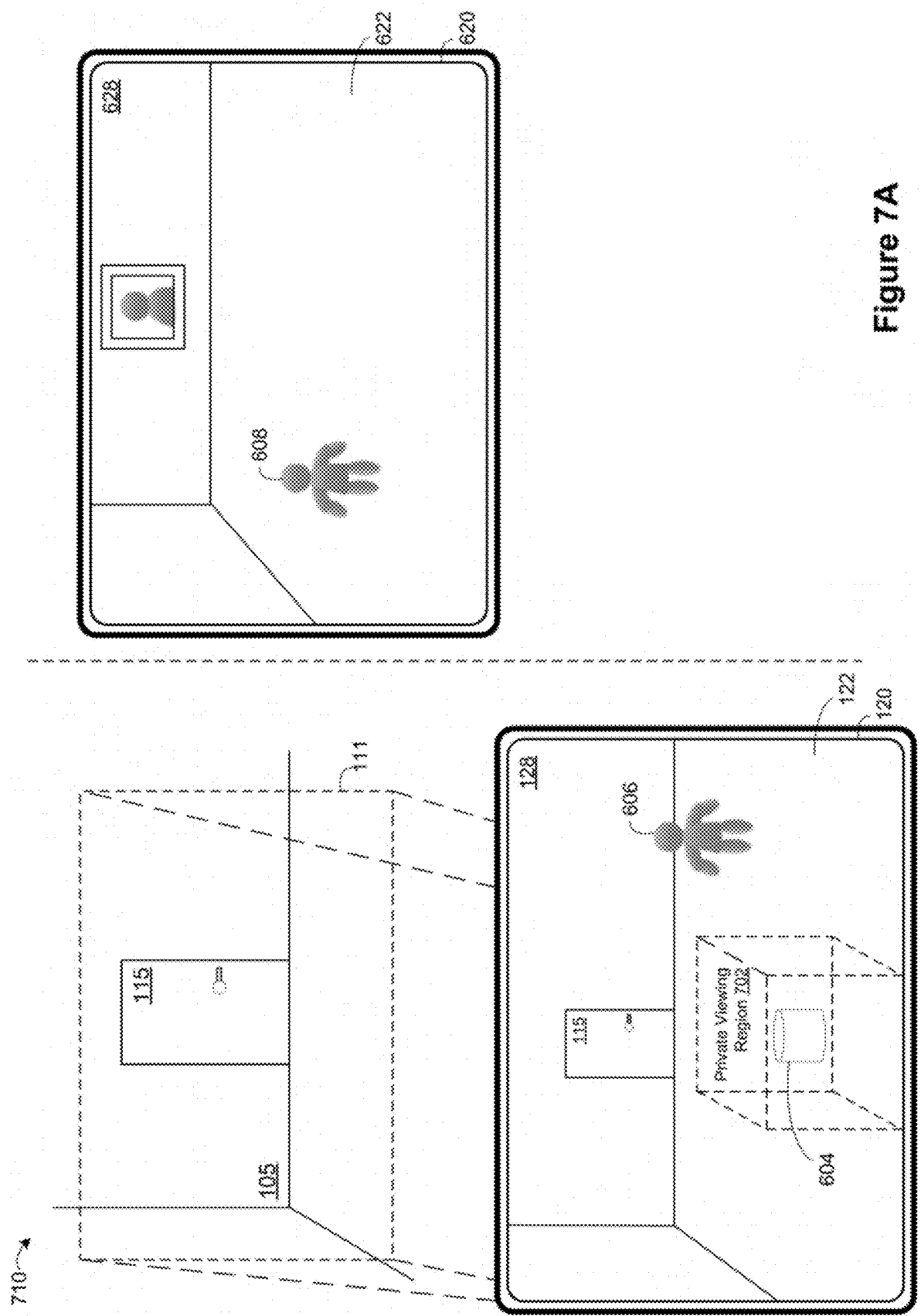
FIGS. 7A-7D illustrate a sequence of instances for a content delivery scenario in accordance with some implementations.

In some implementations, the private viewing region visualizer 542 generates a visualization for the private viewing region (e.g., the private viewing region 602 in FIG. 6, or the private viewing region 702 in FIG. 7A). In some implementations, the private viewing region is centered on the electronic device 120 or the user thereof. In some implementations, the visualization of the private viewing region corresponds to a cylinder, a sphere, a cube, or another geometric shape at least partially surrounding the electronic device 120 or the user thereof.

In some implementations, the private viewing region feedback engine 544 generates sensory feedback (e.g., visual feedback such as text or lighting changes, audio feedback, haptic feedback, etc.) when user input(s) translate the XR content from inside the private viewing region to outside the private viewing region (e.g., as shown by the sequence in FIGS. 7A-7D where textual feedback 704A and audio feedback 704B is provided by the electronic device 120 in FIG. 7C) or vice versa.

In some implementations, the content updater 546 modifies the location of the XR content based on user input(s) that translate the XR content (e.g., as shown by the sequence in FIGS. 7A-7D). In some implementations, the content updater 546 modifies an appearance characteristic of the XR content based on user input(s) that change the appearance characteristic of the XR object. As one example, the content updater 546 may change a color, contrast, brightness, a size, a shape, a texture, shadows, lighting, and/or the like of the XR content based on the user input(s). As another example, the content updater 546 may add XR content portions/components to or remove XR content portions/components of the XR content based on the user input(s). In some implementations, the content updater 546 rotates the XR content based on user input(s) that rotate the XR content.

In some implementations, the characterization vector generator 548 generates a characterization vector 575 for the subject XR content or updates an existing characterization vector for the subject XR content. According to some implementations, the characterization vector 575 is transmitted to at least one other device for display thereon via the data transmitter 246 according to a determination that the first location of the XR content is outside of the private viewing region. According to some implementations, the characterization vector 575 is not transmitted to the at least one other device according to a determination that the first location of the XR content is inside of the private viewing region.

Figure 5B:
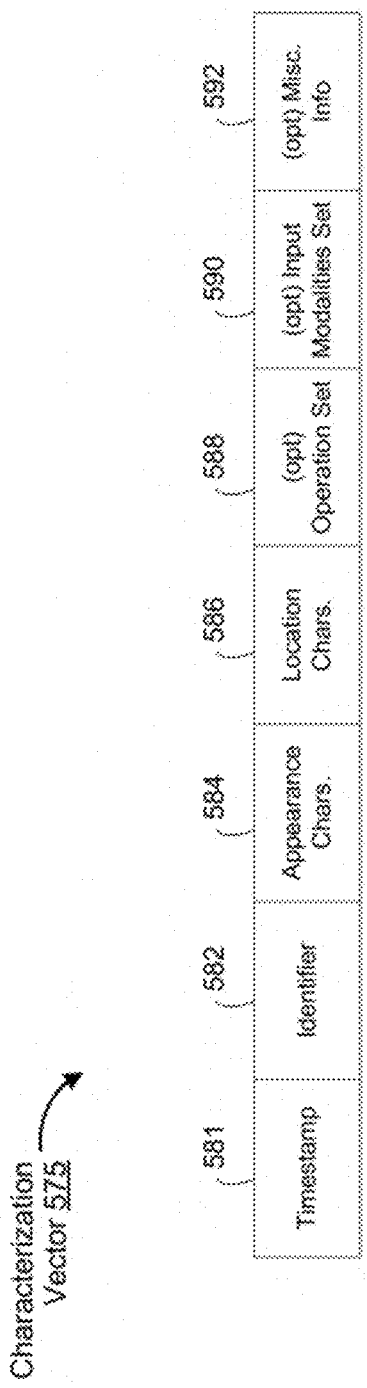
FIG. 5B illustrates an example data structure for a characterization vector in accordance with some implementations.

FIG. 5B shows an example data structure for characterization vector 575 associated with XR content in accordance with some implementations. As shown in FIG. 5B, the characterization vector 575 may correspond to an N-tuple characterization vector or characterization tensor that includes a timestamp 581 (e.g., the most recent time the characterization vector 575 was updated), an identifier 582 associated with the XR content (e.g., a serial number or the like for the subject XR content), appearance characteristics 584 associated with the XR content (e.g., a texture map, shadow(s), color value(s), shape, etc.), and location characteristics 586 associated with the current location of the XR content (e.g., translational values, rotational values, etc.). As shown in FIG. 5B, the characterization vector 575 may optionally include an operation set 588 with predefined operations and/or actions that may be performed on the XR content, an input modalities set 590 with predefined input modalities that may be directed to the XR content such as voice commands, eye gaze commands, gestural/tap command, etc., and miscellaneous information 592 associated with the XR content. One of ordinary skill in the art will appreciate that the data structure for the characterization vector 575 in FIG. 5B is merely an example that may include different information portions in various other implementations and be structured in myriad ways in various other implementations.

According to some implementations, the pose determiner 552 determines a current camera pose of the electronic device 120 and/or the user 150 relative to the XR content 527 and/or the physical environment 105. In some implementations, the renderer 554 renders the XR content 527 and the indication of the private viewing region according to the current camera pose relative thereto.

According to some implementations, the optional image processing architecture 562 obtains an image stream from an image capture device 370 including one or more images of the physical environment 105 from the current camera pose of the electronic device 120 and/or the user 150. In some implementations, the image processing architecture 562 also performs one or more image processing operations on the image stream such as warping, color correction, gamma correction, sharpening, noise reduction, white balance, and/or the like. In some implementations, the optional compositor 564 composites the rendered XR content with the processed image stream of the physical environment 105 from the image processing architecture 562 to produce rendered image frames of the XR environment. In various implementations, the presenter 570 presents the rendered image frames of the XR environment to the user 150 (e.g., via the one or more displays 312 of the electronic device 120). One of ordinary skill in the art will appreciate that the optional image processing architecture 562 and the optional compositor 564 may not be applicable for fully virtual environments (or optical see-through scenarios). As such, in some implementations, the arm and/or hand of the user 150 may not be composited with the rendered XR content (e.g., for fully VR applications).

FIG. 6 illustrates an instance 600 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the instance 600 is rendered and presented by a computing system such as the controller 110 shown in FIGS. 1 and 2; the electronic device 120 shown in FIGS. 1 and 3; and/or a suitable combination thereof.

As shown in FIG. 6, the content delivery scenario includes a physical environment 105 and an XR environment 128 displayed on the display 122 of the electronic device 120 (e.g., associated with the user 150 who may be referred to herein as the first user). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

As shown in FIG. 6, the content delivery scenario also includes an XR environment 628 displayed on the display 622 of the electronic device 620 (e.g., associated with a second user). The electronic device 620 presents the XR environment 628 to a second user while the second user is physically present within the physical environment 105 or in a shared XR environment with the user 150 while not physically present within the physical environment 105. In one example, the first user (e.g., the user 150) and the second user are engaged in a copresence XR experience that may include a shared XR environment with shared XR content. In another example, the first user (e.g., the user 150) and the second user are engaged in a copresence XR experience that may include separate XR environments with shared XR content.

As shown in FIG. 6, during the instance 600 (e.g., associated with time $T_1$) of the content delivery scenario, the electronic device 120 presents an XR environment 128 including: a representation 606 of the second user associated with the electronic device 620, a visualization of a private viewing region 602, and XR content 604 (e.g., a cylinder) outside of the private viewing region 602. In FIG. 6, the visualization of the private viewing region 602 corresponds to an elliptical or spherical geometric shape that at least partially surrounds the electronic device 120 and/or the user 150.

According to some implementations, the computing system transmits a characterization vector associated with the XR content 604 to the electronic device 620 for display thereon (or the controller 110) according to a determination that a current location of the XR content 604 is outside of the private viewing region 602. As a result, as shown in FIG. 6, during the instance 600 (e.g., associated with time $T_1$) of the content delivery scenario, the electronic device 620 presents an XR environment 628 including: a representation 608 of the first user associated with the electronic device 120, and the XR content 604 (e.g., a cylinder).

FIGS. 7A-7D illustrate a sequence of instances 710, 720, 730, and 740 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 710, 720, 730, and 740 are rendered and presented by a computing system such as the controller 110 shown in FIGS. 1 and 2; the electronic device 120 shown in FIGS. 1 and 3; and/or a suitable combination thereof.

FIGS. 7A-7D are similar to and adapted from FIG. 6. As such, similar references numbers are used in FIGS. 6 and FIGS. 7A-7D. Furthermore, only the differences between FIGS. 6 and FIGS. 7A-7D are described for the sake of brevity. As shown in FIG. 7A, during the instance 710 (e.g., associated with time $T_1$) of the content delivery scenario, the electronic device 120 presents an XR environment 128 including: a representation 606 of the second user associated with the electronic device 620, a visualization of a private viewing region 702, and XR content 604 (e.g., a cylinder) inside of the private viewing region 702. In FIGS. 7A-7D, the visualization of the private viewing region 702 corresponds to a cubic geometric shape that at least partially surrounds the electronic device 120 and/or the user 150.

According to some implementations, the computing system forgoes transmitting the characterization vector associated with the XR content 604 to the electronic device 620 for display thereon (or the controller 110) according to a determination that a current location of the XR content 604 is inside of the private viewing region 702 (e.g., the current content privacy status for the XR content 604 is set to private). As a result, as shown in FIG. 7A, during the instance 710 (e.g., associated with time $T_1$) of the content delivery scenario, the electronic device 620 presents an XR environment 628 including a representation 608 of the first user associated with the electronic device 120 without the XR content 604 (e.g., the cylinder). Alternatively, during the instance 710 (e.g., associated with time $T_1$) of the content delivery scenario, the electronic device 620 presents an XR environment 628 including a representation 608 of the first user associated with the electronic device 120 and an obfuscated representation of the XR content 604. For example, the obfuscated representation of the XR content 604 corresponds to a pixelated, blurred, amorphous, and/or the like version of the XR content 604. In this example, the electronic device 620 presents an obfuscated version of the XR content 604 so that the user is aware of the presence of some XR content being manipulated or acted on by the user 150 but not the specific nature, appearance, etc. of the XR content 604.

Figure 7B:
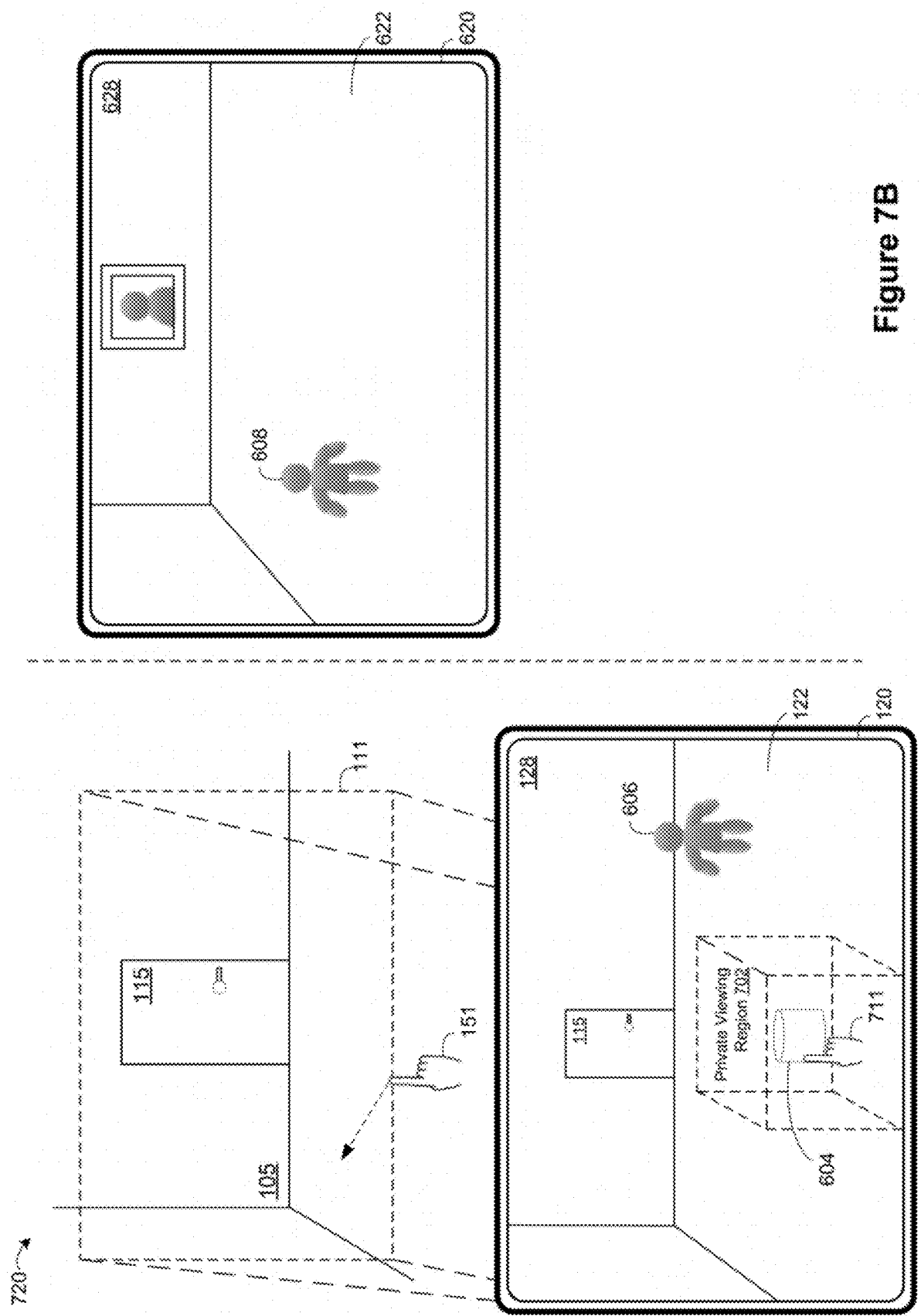

As shown in FIG. 7B, during the instance 720 (e.g., associated with time $T_2$) of the content delivery scenario, the electronic device 120 detects, via the hand/finger/extremity tracking engine, a gestural input with a right hand 151 of the user 150 (e.g., the first user) associated with translating the XR content 604. As shown in FIG. 7B, the electronic device 120 presents a representation 711 of the right hand 151 of the user 150 within the XR environment 128. As shown in FIG. 7B, the XR environment 628 remains the same as in FIG. 7A.

Figure 7C:
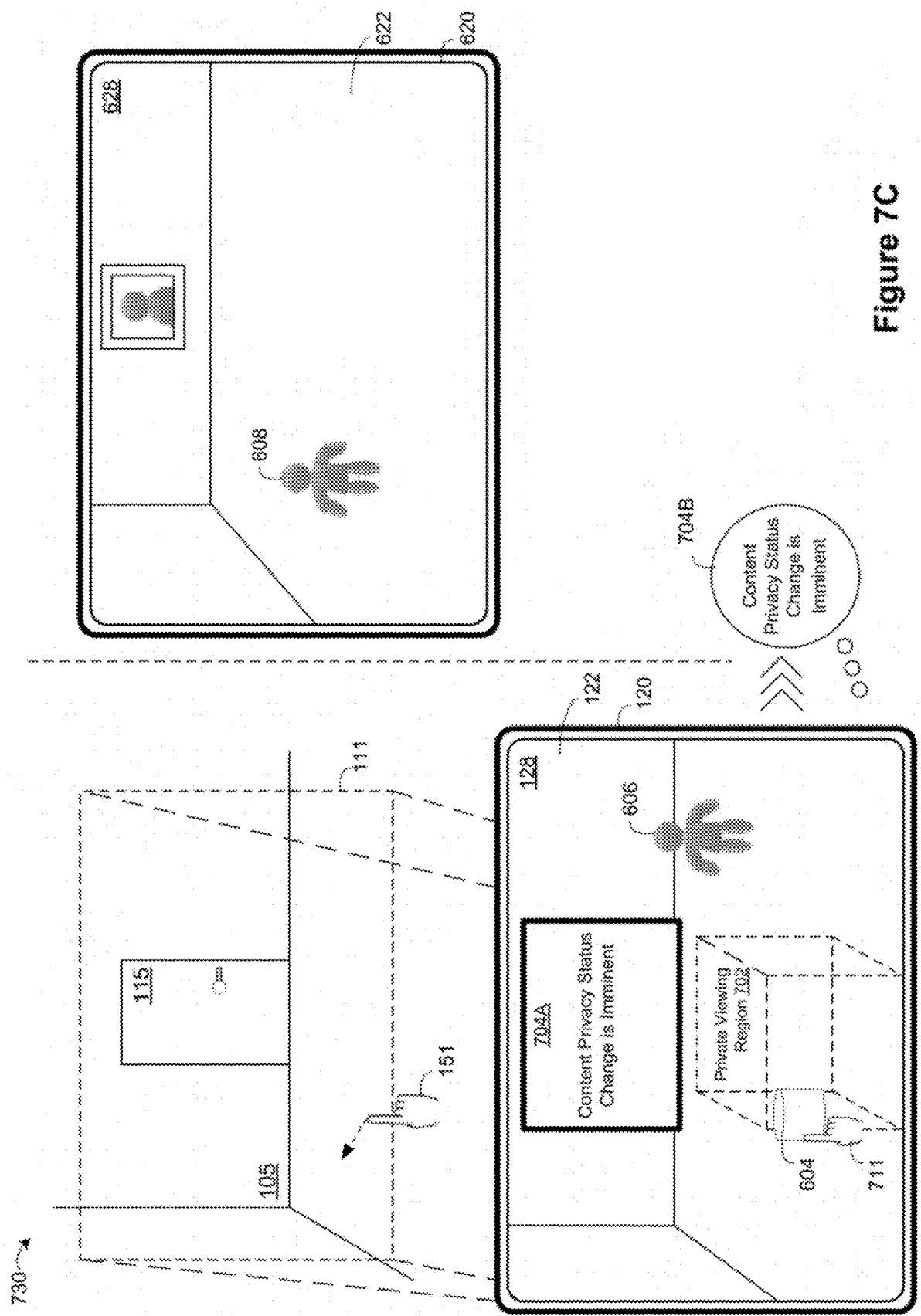

As shown in FIG. 7C, during the instance 730 (e.g., associated with time T₃) of the content delivery scenario, the electronic device 120 continues to detect, via the hand/finger/extremity tracking engine, the gestural input with the right hand 151 of the user 150 (e.g., the first user) associated with translating the XR content 604. According to a determination that the current location of the XR content 604 coincides with a border or boundary of the private viewing region 702, the electronic device 120 provides sensory feedback including a text notification 704A (e.g., "Content Privacy Status Change is Imminent") and an audible notification 704B (e.g., "Content Privacy Status Change is Imminent"). As shown in FIG. 7C, the XR environment 628 remains the same as in FIG. 7A.

Figure 7D:
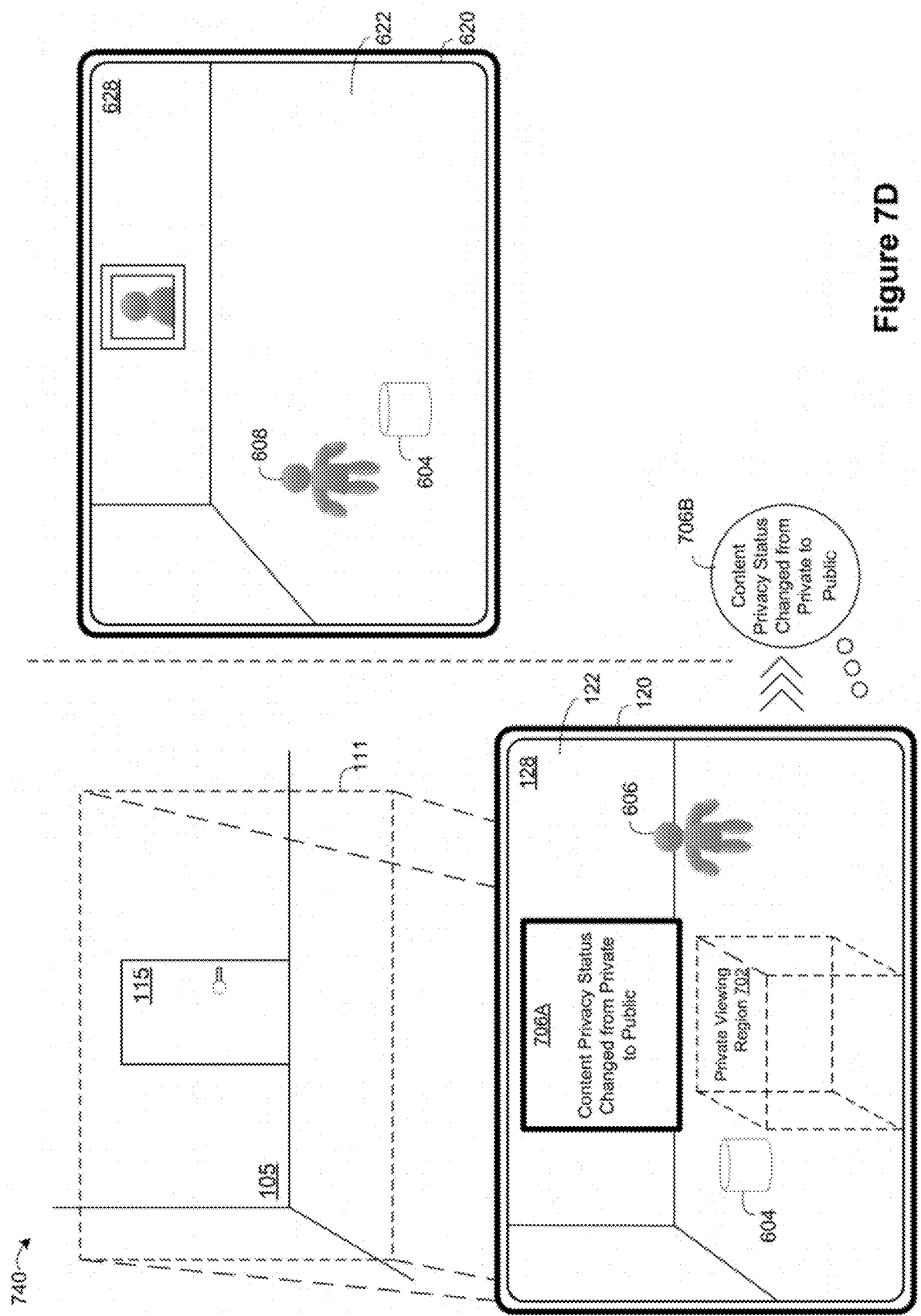

As shown in FIG. 7D, during the instance 740 (e.g., associated with time T₄) of the content delivery scenario, the electronic device 120 determines that the XR content 604 is now outside of the private viewing region 702. According to a determination that the current location of the XR content 604 is outside of the border or boundary of the private viewing region 702, the electronic device 120 provides sensory feedback including a text notification 706A (e.g., "Content Privacy Status Changed from Private to Public") and an audible notification 706B (e.g., "Content Privacy Status Changed from Private to Public").

According to some implementations, the computing system transmits the characterization vector associated with the XR content 604 to the electronic device 620 for display thereon (or the controller 110) according to a determination that a current location of the XR content 604 is outside of the private viewing region 702 (e.g., the current content privacy status for the XR content 604 is set to public). As a result, as shown in FIG. 7D, during the instance 740 (e.g., associated with time T₄) of the content delivery scenario, the electronic device 620 presents an XR environment 628 including: the representation 608 of the first user associated with the electronic device 120, and the XR content 604 (e.g., the cylinder).

In some implementations, a shared private viewing region may be available to the user 150 of the electronic device 120 and the user of the electronic device 620. For example, either the user 150 of the electronic device 120 or the user of the electronic device 620 may instantiate XR content into the shared private viewing region that is viewable to both users. In this example, either the user 150 of the electronic device 120 or the user of the electronic device 620 may rotate, translate, or manipulate XR content within the shared private viewing region. Continuing with this example, either the user 150 of the electronic device 120 or the user of the electronic device 620 may change the privacy status of XR content by moving the XR content into or out of the shared private viewing region. One of ordinary skill in the art will appreciate that this embodiment may be extended to more than two users in a co-presence XR experience. One of ordinary skill in the art will appreciate that the shared private viewing region may be limited to users on a predefined list of users associated with the shared private viewing region or to users invited to collaborate within the shared private viewing region. Thus, for example, the characterization vector associated with the XR content 604 is not transmitted to other users that are not included on the predefined list of users associated with the shared private viewing region or who have not been invited to collaborate within the shared private viewing region.

Figure 8A:
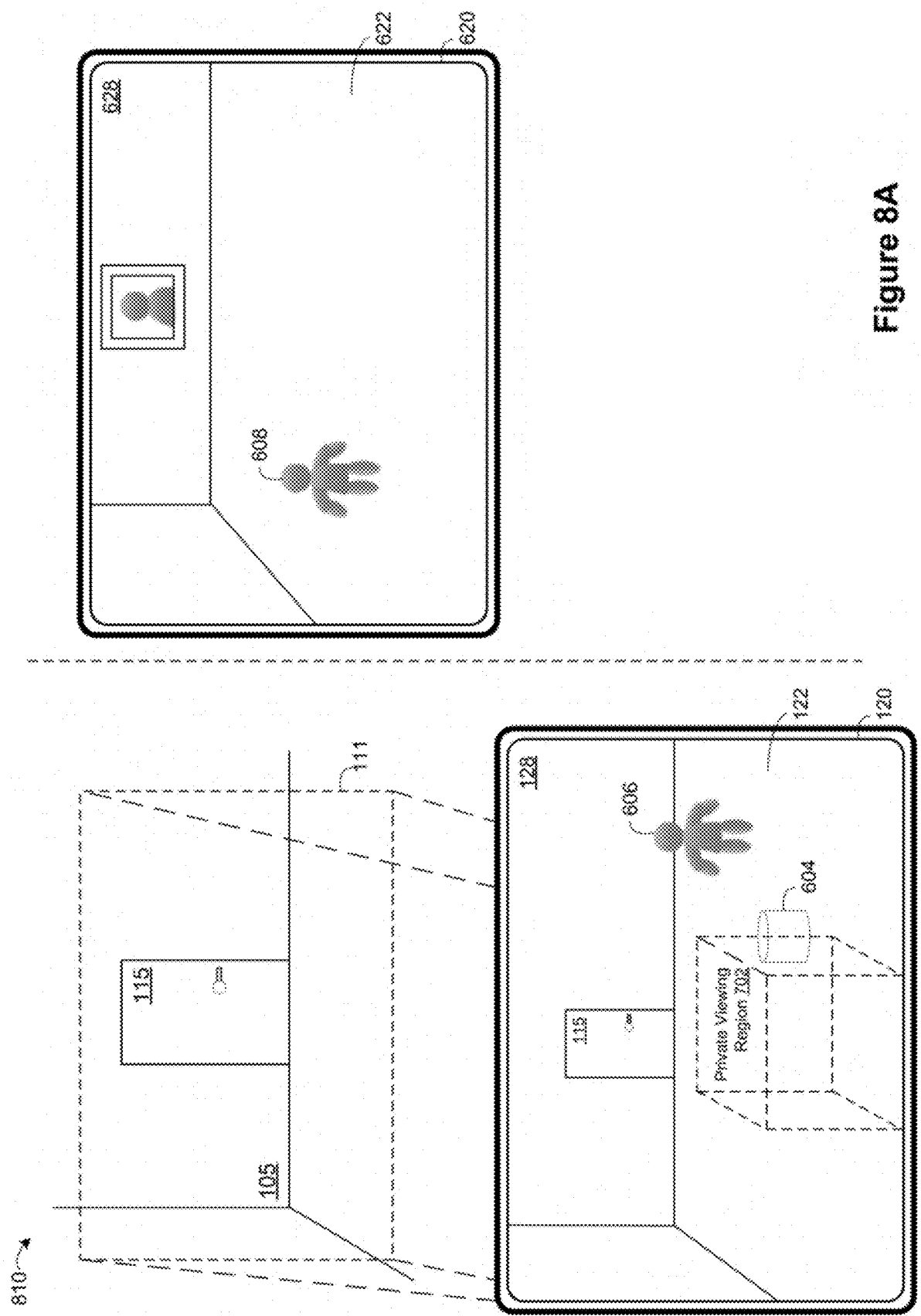
FIGS. 8A and 8B illustrate alternative instances for a content delivery scenario in accordance with some implementations.
Figure 8B:
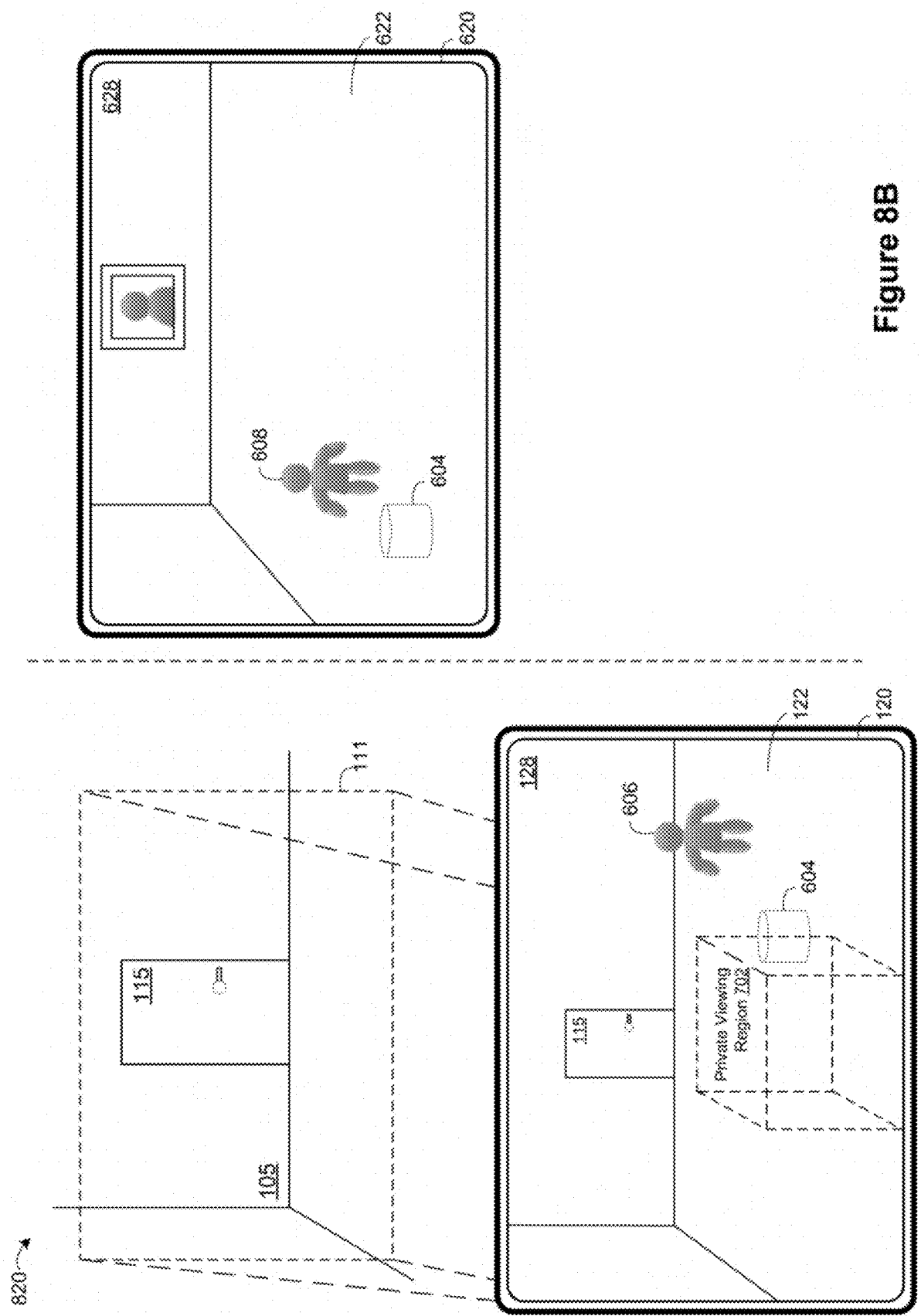

FIGS. 8A and 8B illustrate alternative instances 810 and 820 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the instances 810 and 820 are rendered and presented by a computing system such as the controller 110 shown in FIGS. 1 and 2; the electronic device 120 shown in FIGS. 1 and 3; and/or a suitable combination thereof.

FIGS. 8A and 8B are similar to and adapted from FIGS. 6 and 7A-7D. As such, similar references numbers are used in FIGS. 8A and 8B and FIGS. 6 and 7A-7D. Furthermore, only the differences between FIGS. 8A and 8B and FIGS. 6 and 7A-7D are described for the sake of brevity. As shown in FIG. 8A, during the instance 810 of the content delivery scenario, the electronic device 120 presents an XR environment 128 including: the representation 606 of the second user associated with the electronic device 620, the visualization of the private viewing region 702, and XR content 604 (e.g., the cylinder) on the border or boundary of the private viewing region 702.

According to a determination that the current location of the XR content 604 coincides with a border or boundary of the private viewing region 702 but is not fully outside of the private viewing region 702, the computing system forgoes transmitting the characterization vector associated with the XR content 604 to the electronic device 620 for display thereon (e.g., the current content privacy status for the XR content 604 is set to private). As a result, as shown in FIG. 8A, during the instance 810 of the content delivery scenario, the electronic device 620 presents an XR environment 628 including a representation 608 of the first user associated with the electronic device 120 without the XR content 604 (e.g., the cylinder).

Instance 820 in FIG. 8B illustrates an alternative implementation to the instance 810 in FIG. 8A. As shown in FIG. 8B, during the instance 820 of the content delivery scenario, the electronic device 120 presents an XR environment 128 including: the representation 606 of the second user associated with the electronic device 620, the visualization of the private viewing region 702, and XR content 604 (e.g., the cylinder) on the border or boundary of the private viewing region 702.

According to a determination that the current location of the XR content 604 coincides with a border or boundary of the private viewing region 702 and the XR content 604 is at least partially outside of the private viewing region 702, the computing system transmits the characterization vector associated with the XR content 604 to the electronic device 620 for display thereon (e.g., the current content privacy status for the XR content 604 is set to public). As a result, as shown in FIG. 8B, during the instance 820 of the content delivery scenario, the electronic device 620 presents an XR environment 628 including: the representation 608 of the first user associated with the electronic device 120, and the XR content 604 (e.g., the cylinder).

Figure 9:
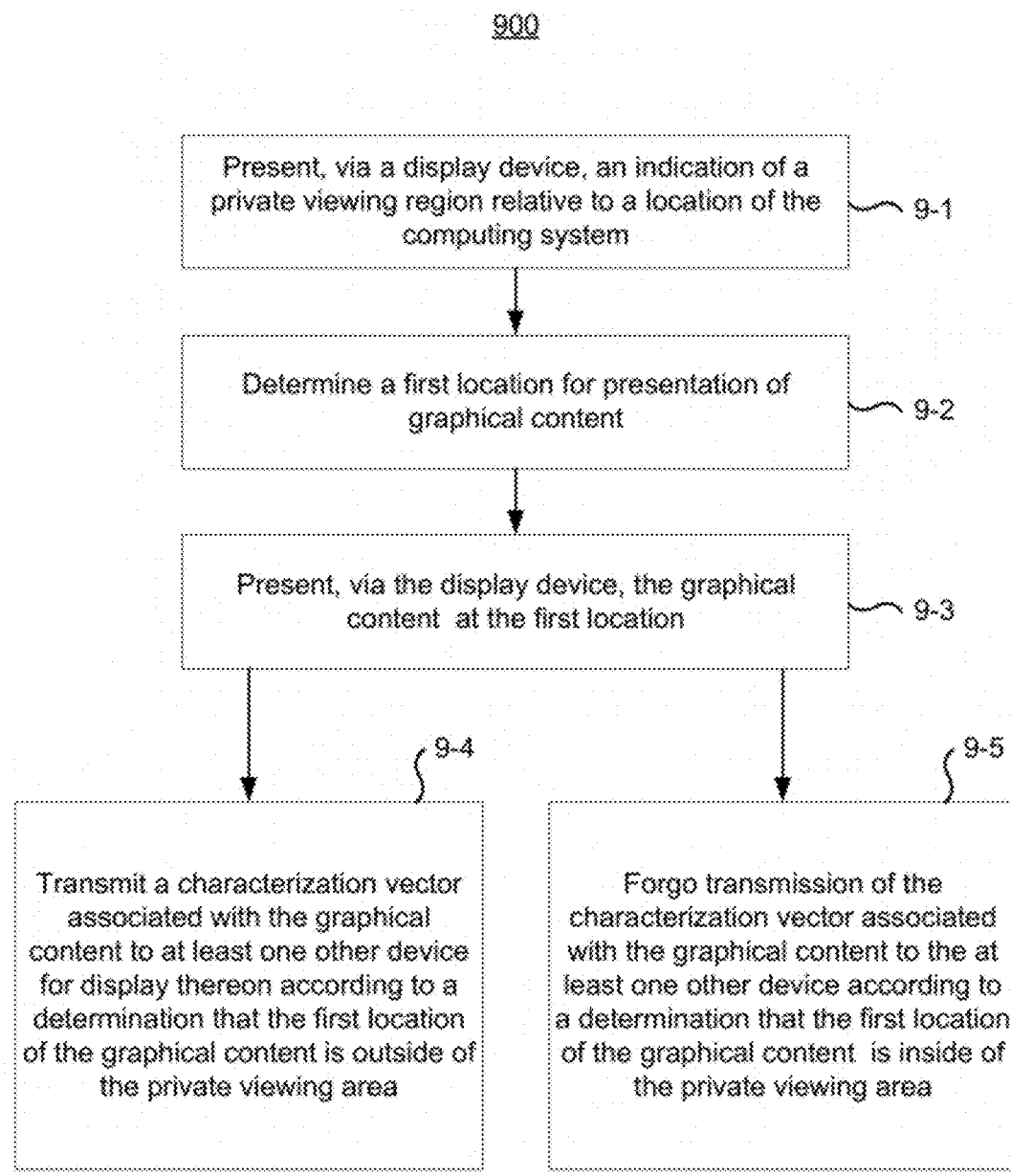
FIG. 9 is a flowchart representation of a method of spatially designating private content in accordance with some implementations.

FIG. 9 is a flowchart representation of a method 900 of spatially designating private content in accordance with some implementations. In various implementations, the method 900 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, while in a copresence experience, a user may not want to expose graphical content (e.g., XR content) to other users and maintain privacy over some graphical content. One way to maintain privacy over graphical content includes manual designation of specific content as private based on voice commands, gestural commands (e.g., tap to set as private), or the like. As such, in some implementations, the innovation described herein provides an alternative scheme including a spatially defined region in which graphical content is private to the user and graphical content outside of the region is publicly viewable to other users in the copresence experience. Put another way, in some implementations, the computing systems may present an XR visualization of a user's private viewing region where content inside of the private viewing region is only viewable to the user and content outside of the private viewing region is viewable to others in the copresence experience.

As represented by block 9-1, the method 900 includes presenting, via the display device, an indication of a private viewing region relative to a location of the computing system. In some implementations, the indication corresponds to an XR visualization of the private viewing region such as a box, cube, sphere, or the like that fully or partially surrounds the computing system and/or the user 150 of the computing system. In some implementations, the indication corresponds to audio, haptic, etc. feedback once the border or boundary of the private viewing region is crossed.

In some implementations, presenting the indication of the private viewing region includes presenting, via the display device, a visualization of the private viewing region at least partially surrounding the location of the computing system. In some implementations, the visualization of the private viewing region corresponds to one of text, a cube, a cylinder, a sphere, or another geometric shape at least partially surrounding the location of the computing system. For example, the bounds of the geometric shape are at least partially translucent or dotted/non-solid to reduce occlusion.

In some implementations, the location of the private viewing region is stationary. For example, the user may translate within the physical environment such that he/she moves out of the private viewing region and, thereafter, (optionally) returns to the private viewing region. In this example, the user may also select and translate graphical content that was initially outside of the private viewing region into the private viewing region when returning to the private viewing region. In some implementations, the location of the private viewing region is dynamic. For example, the user may translate within the physical environment and the location of the private viewing region moves to remain centered on the user.

In some implementations, the computing system or a component thereof (e.g., the private viewing region visualizer 542 in FIGS. 2 and 5A) generates a visualization for the private viewing region. FIG. 6, for example, shows a visualization of a private viewing region 602 within the XR environment 128 that corresponds to an elliptical or spherical geometric shape that at least partially surrounds the electronic device 120 and/or the user 150. FIGS. 7A-7D, for example, show a visualization of a private viewing region 702 within the XR environment 128 that corresponds to a cubic geometric shape that at least partially surrounds the electronic device 120 and/or the user 150.

As represented by block 9-2, the method 900 includes determining a first location for presentation of graphical content (e.g., XR content). In some implementations, the computing system or a component thereof (e.g., the content locator 510 in FIGS. 2 and 5A) determines an origin location for presentation of graphical content and updated location(s) for the graphical content based on user input(s) that translate the graphical content.

As represented by block 9-3, the method 900 includes presenting, via the display device, the graphical content at the first location. In some implementations, the graphical content corresponds to a static/stationary object, a moving object, a virtual agent that may interact with the user, or the like. In some implementations, the graphical content is selected by the user from a menu of graphical content items. In some implementations, the graphical content is surfaced by the computing system (e.g., as a suggestion/recommendation, a notification, and/or the like).

As one example, in FIG. 6, the electronic device 120 presents an XR environment 128 including: a representation 606 of the second user associated with the electronic device 620, a visualization of a private viewing region 602, and XR content 604 (e.g., a cylinder) outside of the private viewing region 602. As another example, in FIG. 7A, the electronic device 120 presents an XR environment 128 including: the representation 606 of the second user associated with the electronic device 620, a visualization of a private viewing region 702, and the XR content 604 (e.g., the cylinder) inside of the private viewing region 702.

For example, with reference to FIG. 5A, the computing system or a component thereof (e.g., the content selector 524) obtains (e.g., receives, retrieves, etc.) XR content 527 from the content library 525 based on one or more user inputs 521 (e.g., selecting the XR content 527 from a menu of XR content items). Continuing with this example, the computing system or a component thereof (e.g., the pose determiner 552) determines a current camera pose of the electronic device 120 and/or the user 150 relative to an origin location for the XR content 527. Continuing with this example, the computing system or a component thereof (e.g., the renderer 554) renders the XR content 527 according to the current camera pose relative thereto. According to some implementations, the pose determiner 552 updates the current camera pose in response to detecting translational and/or rotational movement of the electronic device 120 and/or the user 150. Continuing with this example, in video pass-through scenarios, the computing system or a component thereof (e.g., the compositor 564) obtains (e.g., receives, retrieves, etc.) one or more images of the physical environment 105 captured by the image capture device 370 and composites the rendered XR content 527 with the one or more images of the physical environment 105 to produce one or more rendered image frames. Finally, the computing system or a component thereof (e.g., the A/V presenter 570) presents or causes presentation of the one or more rendered image frames (e.g., via the one or more displays 312 or the like). One of ordinary skill in the art will appreciate that the operations of the optional compositor 564 may not be applicable for fully virtual environments or optical see-through scenarios.

In some implementations, the display device corresponds to a transparent lens assembly, and wherein the graphical content is projected onto the transparent lens assembly. In some implementations, the display device corresponds to a near-eye system, and wherein presenting the graphical content includes compositing the graphical content with one or more images of a physical environment captured by an exterior-facing image sensor.

In some implementations, the method 900 includes: detecting one or more user inputs, via the one or more input devices, associated with changing an appearance characteristic of the graphical content; and in response to detecting the one or more user inputs, updating the appearance characteristic of the graphical content based on the one or more user inputs while maintaining presentation of the graphical content at the first location. In some implementations, the computing system or a component thereof (e.g., the content updater 546 in FIG. 5A) modifies an appearance characteristic of the graphical content based on user input(s) that change the appearance characteristic of the graphical content. As one example, the content updater 546 may change a color, contrast, brightness, a size, a shape, a texture, shadows, lighting, and/or the like of the graphical content based on the user input(s). As another example, the content updater 546 may add graphical content portions/components to or remove portions/components of the graphical content t based on the user input(s).

In some implementations, the method 900 includes: detecting one or more user inputs, via the one or more input devices, associated with rotating the graphical content; and in response to detecting the one or more user inputs, rotating the graphical content based on the one or more user inputs while maintaining presentation of the graphical content at the first location. In some implementations, the computing system or a component thereof (e.g., the content updater 546 in FIG. 5A) rotates the graphical content based on user input(s) that rotate the graphical content.

As represented by block 9-4, the method 900 includes transmitting a characterization vector associated with the graphical content to at least one other device (or optionally the controller 110 in FIGS. 1 and 3) to cause display thereon according to a determination that the first location of the graphical content is outside of the private viewing area. In some implementations, the computing system or a component thereof (e.g., the data transmitter 246 in FIG. 5A) transmits a characterization vector associated with the graphical content to at least one other device for display thereon according to a determination that the first location of the graphical content is outside of the private viewing area.

In some implementations, with reference to FIG. 4, the controller 110 manages the public/private status of the XR content within the perspectives 410A, 410B, and 410C of the shared XR environment 405 based on user inputs received from the electronic devices 420A, 420B, and 420C. As such, with this centralized approach, the controller 110 manages the shared XR environment 405 for the electronic devices 420A, 420B, and 420C. In another decentralized or peer-to-peer approach, the electronic devices 420A, 420B, and 420C may share or multicast detected user inputs to the other devices in order to update their own perspectives accordingly such as when XR content changes from public to private or vice versa.

For example, as shown in FIG. 6, the computing system transmits a characterization vector associated with the XR content 604 to the electronic device 620 for display thereon according to a determination that a current location of the XR content 604 is outside of the private viewing region 602. As a result, as shown in FIG. 6, during the instance 600 (e.g., associated with time $T_1$) of the content delivery scenario, the electronic device 620 presents an XR environment 628 including: a representation 608 of the first user associated with the electronic device 120, and the XR content 604 (e.g., the cylinder).

In some implementations, the characterization vector associated with the graphical content includes an identifier associated with the graphical content, appearance characteristics associated with the graphical content, and location characteristics associated with the graphical content such as translation and rotation values relative to the current environment or relative to a world coordinate system. In some implementations, the at least one other device is associated with a second user that is participating in a copresence session with a first user of the computing system. For example, FIG. 5B illustrates an example characterization vector 575.

In some implementations, transmitting the characterization vector associated with the graphical content to at least one other device for display thereon occurs when the first location of the graphical content is outside of the private viewing area and an entirety of the graphical content is outside of the private viewing area. For example, the first location corresponds to a centroid or other predefined point associated with the graphical content. As such, in some implementations, the computing system forgoes transmission of the characterization vector for the graphical content when the graphical content is straddling the border or boundary of the private viewing area. For example, as shown in FIG. 8A, according to a determination that the current location of the XR content 604 coincides with a border or boundary of the private viewing region 702 but is not fully outside of the private viewing region 702, the computing system forgoes transmitting the characterization vector associated with the XR content 604 to the electronic device 620 for display thereon (e.g., the current content privacy status for the XR content 604 is set to private). As a result, as shown in FIG. 8A, during the instance 810 of the content delivery scenario, the electronic device 620 presents an XR environment 628 including a representation 608 of the first user associated with the electronic device 120 without the XR content 604 (e.g., the cylinder).

In some implementations, transmitting the characterization vector associated with the graphical content to at least one other device for display thereon occurs when the first location of the graphical content is outside of the private viewing area and the graphical content is at least partially outside of the private viewing area. For example, the first location corresponds to a centroid or other predefined point associated with the graphical content. As such, in some implementations, the computing system transmits the characterization vector for the graphical content when the graphical content is straddling the border or boundary of the private viewing area. For example, as shown in FIG. 8B, according to a determination that the current location of the XR content 604 coincides with a border or boundary of the private viewing region 702 and the XR content 604 is at least partially outside of the private viewing region 702, the computing system transmits the characterization vector associated with the XR content 604 to the electronic device 620 for display thereon (e.g., the current content privacy status for the XR content 604 is set to public). As a result, as shown in FIG. 8B, during the instance 820 of the content delivery scenario, the electronic device 620 presents an XR environment 628 including: the representation 608 of the first user associated with the electronic device 120, and the XR content 604 (e.g., the cylinder).

In some implementations, the method 900 includes: while the first location is outside of the private viewing area, detecting one or more user inputs, via the one or more input devices, associated with translating the graphical content from the first location to a second location; and in response to detecting the one or more user inputs: continuing to transmit the characterization vector associated with the graphical content to at least one other device for display thereon according to a determination that the second location of the graphical content is outside of the private viewing area; and forgoing transmission of the characterization vector associated with the graphical content to the at least one other device according to a determination that the second location of the graphical content is inside of the private viewing area. In other words, the content privacy status changes from public to private as a translational user input moves the graphical content from outside of the private viewing area to inside of the private viewing area. For example, In some implementations, transmitting the characterization vector associated with the graphical content to at least one other device for display thereon according to a determination that the first location of the graphical content is outside of the private viewing region includes transmitting the characterization vector associated with the graphical content to a first set of one or more device for display thereon that are included on a predefined list of users and forgoing transmission of the characterization vector associated with the graphical content to a second set of one or more device that are not included on a predefined list of users. For example, with reference to FIG. 6, a shared private viewing region may be available to the user 150 of the electronic device 120 and the user of the electronic device 620. One of ordinary skill in the art will appreciate that this embodiment may be extended to more than two users in a co-presence XR experience. One of ordinary skill in the art will appreciate that the shared private viewing region may be limited to users on a predefined list of users associated with the shared private viewing region or to users invited to collaborate within the shared private viewing region.

As represented by block 9-5, the method 900 includes forgoing transmission of the characterization vector associated with the graphical content to the at least one other device (or optionally the controller 110 in FIGS. 1 and 3) according to a determination that the first location of the graphical content is inside of the private viewing area. In some implementations, the computing system or a component thereof (e.g., the data transmitter 246 in FIG. 5A) forgoes or ceases transmission of the characterization vector associated with the graphical content to the at least one other device according to a determination that the first location of the graphical content is inside of the private viewing area.

For example, as shown in FIG. 7A, the computing system forgoes transmitting the characterization vector associated with the XR content 604 to the electronic device 620 for display thereon according to a determination that a current location of the XR content 604 is inside of the private viewing region 702 (e.g., the current content privacy status for the XR content 604 is set to private). As a result, as shown in FIG. 7A, during the instance 710 (e.g., associated with time $T_1$) of the content delivery scenario, the electronic device 620 presents an XR environment 628 including a representation 608 of the first user associated with the electronic device 120 without the XR content 604 (e.g., a cylinder).

In some implementations, the method 900 includes: while the first location is inside of the private viewing area, detecting one or more user inputs, via the one or more input devices, associated with translating the graphical content from the first location to a second location; and in response to detecting the one or more user inputs: transmitting the characterization vector associated with the graphical content to at least one other device for display thereon according to a determination that the second location of the graphical content is outside of the private viewing area; and continuing to forgo transmission of the characterization vector associated with the graphical content to the at least one other device according to a determination that the second location of the graphical content is inside of the private viewing area. In other words, the content privacy status changes from private to public as a translational user input moves the graphical content from inside of the private viewing area to outside of the private viewing area. For example, FIGS. 7A-7D show a sequence of instances 710, 720, 730, and 740, respectively, in which the content privacy status of the XR content 604 changes from private to public as a translational user input moves the XR content 604 from inside of the private viewing area 702 in FIG. 7A to outside of the private viewing area 702 in FIG. 7D.

In some implementations, the method 900 includes presenting, via the display device, a visual notification indicating that a privacy status associated with the graphical content has changed according to a determination that the second location of the graphical content changes the graphical content from one of: inside to outside of the private viewing area, or outside to inside of the private viewing area. As shown in FIGS. 7D, for example, the electronic device 120 provides a visual notification indicating that a privacy status associated with the XR content 604 has changed from private to public according to a determination that the second location of the XR content 604 changes the XR content 604 from inside to outside of the private viewing area 702. In FIG. 7D, the visual notification corresponds to a text notification 706A (e.g., "Content Privacy Status Changed from Private to Public").

In some implementations, the method 900 includes providing sensory feedback indicating that a privacy status associated with the graphical content has changed according to a determination that the second location of the graphical content changes graphical content from one of: inside to outside of the private viewing area, or outside to inside of the private viewing area. In some implementations, the sensory feedback corresponds to one of audio or haptic feedback. As shown in FIGS. 7D, for example, the electronic device 120 provides sensory feedback indicating that a privacy status associated with the XR content 604 has changed from private to public according to a determination that the second location of the XR content 604 changes the XR content 604 from inside to outside of the private viewing area 702. In FIG. 7D, the sensory feedback corresponds to an audible notification 706B (e.g., "Content Privacy Status Changed from Private to Public").

In some implementations, the method 900 includes providing visual and/or sensory feedback indicating that a privacy status change associated with the graphical content is imminent according to a determination that the second location of the graphical content coincides with a border or boundary of the private viewing area. As shown in FIGS. 7C, for example, the electronic device 120 provides visual and sensory feedback indicating that a privacy status change associated with the XR content 604 is imminent according to a determination that the current location of the XR content 604 coincides with a border or boundary of the private viewing region 702. In FIG. 7C, the visual and sensory feedback includes a text notification 704A (e.g., "Content Privacy Status Change is Imminent") and an audible notification 704B (e.g., "Content Privacy Status Change is Imminent").

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
presenting, via the display device, an indication of a private viewing region relative to a location of the computing system;
presenting, via the display device, graphical content at a first location;
transmitting a characterization vector associated with the graphical content to at least one other device for display thereon according to a determination that the first location of the graphical content is outside of the private viewing region;
forgoing transmission of the characterization vector associated with the graphical content to the at least one other device according to a determination that the first location of the graphical content is inside of the private viewing region;
detecting one or more user inputs, via the one or more input devices, associated with translating the graphical content from the first location to a second location; and
in response to detecting the one or more user inputs:
transmitting the characterization vector associated with the graphical content to the at least one other device for display thereon according to a determination that the second location of the graphical content is outside of the private viewing region; and
forgoing transmission of the characterization vector associated with the graphical content to the at least one other device according to a determination that the second location of the graphical content is inside of the private viewing region.

2. The method of claim 1, wherein presenting the indication of the private viewing region includes presenting, via the display device, a visualization of the private viewing region at least partially surrounding the location of the computing system.

3. The method of claim 2, wherein the visualization of the private viewing region corresponds to one of text, a cube, a cylinder, a sphere, or another geometric shape at least partially surrounding the location of the computing system.

4. The method of claim 1, wherein the characterization vector associated with the graphical content includes an identifier associated with the graphical content, appearance characteristics associated with the graphical content, and location characteristics associated with the graphical content.

5. The method of claim 1, wherein the first location is outside the private region.

6. The method of claim 1, wherein the first location is inside the private region.

7. The method of claim 1, further comprising:
presenting, via the display device, a visual notification indicating that a privacy status associated with the graphical content has changed according to a determination that the second location of the graphical content changes the graphical content from one of: inside to outside of the private viewing region, or outside to inside of the private viewing region.

8. The method of claim 1, further comprising:
providing sensory feedback indicating that a privacy status associated with the graphical content has changed according to a determination that the second location of the graphical content changes the graphical content from one of: inside to outside of the private viewing region, or outside to inside of the private viewing region.

9. The method of claim 8, wherein the sensory feedback corresponds to one of audio or haptic feedback.

10. The method of claim 1, further comprising:
detecting one or more user inputs, via the one or more input devices, associated with changing an appearance characteristic of the graphical content; and
in response to detecting the one or more user inputs, updating the appearance characteristic of the graphical content based on the one or more user inputs while maintaining presentation of the graphical content at the first location.

11. The method of claim 1, further comprising:
detecting one or more user inputs, via the one or more input devices, associated with rotating the graphical content; and
in response to detecting the one or more user inputs, rotating the graphical content based on the one or more user inputs while maintaining presentation of the graphical content at the first location.

12. The method of claim 1, wherein transmitting the characterization vector associated with the graphical content to at least one other device for display thereon occurs when the first location of the graphical content is outside of the private viewing region and an entirety of the graphical content is outside of the private viewing region.

13. The method of claim 1, wherein transmitting the characterization vector associated with the graphical content to at least one other device for display thereon occurs when the first location of the graphical content is outside of the private viewing region and the graphical content is at least partially outside of the private viewing region.

14. The method of claim 1, wherein the graphical content corresponds to one of a virtual agent, a stationary graphical content, or a moving graphical content.

15. The method of claim 1, wherein the at least one other device is associated with a second user that is participating in a copresence session with a first user of the computing system.

16. The method of claim 1, wherein transmitting the characterization vector associated with the graphical content to the at least one other device for display thereon according to a determination that the first location of the graphical content is outside of the private viewing region includes transmitting the characterization vector associated with the graphical content to a first set of one or more device for display thereon that are included on a predefined list of users and forgoing transmission of the characterization vector associated with the graphical content to a second set of one or more device that are not included on a predefined list of users.

17. A device comprising:
one or more processors;
a non-transitory memory;
an interface for communicating with a display device and one or more input devices; and
one or more programs stored in the non-transitory memory, which, when executed by the one or more processors, cause the device to:
present, via the display device, an indication of a private viewing region relative to a location of the computing system;
present, via the display device, graphical content at a first location;
transmit a characterization vector associated with the graphical content to at least one other device for display thereon according to a determination that the first location of the graphical content is outside of the private viewing region;
forgo transmission of the characterization vector associated with the graphical content to the at least one other device according to a determination that the first location of the graphical content is inside of the private viewing region;
detect one or more user inputs, via the one or more input devices, associated with translating the graphical content from the first location to a second location; and
in response to detecting the one or more user inputs:
transmit the characterization vector associated with the graphical content to the at least one other device for display thereon according to a determination that the second location of the graphical content is outside of the private viewing region; and
forgo transmission of the characterization vector associated with the graphical content to the at least one other device according to a determination that the second location of the graphical content is inside of the private viewing region.

18. The device of claim 17, wherein presenting the indication of the private viewing region includes presenting, via the display device, a visualization of the private viewing region at least partially surrounding the location of the computing system.

19. The device of claim 18, wherein the visualization of the private viewing region corresponds to one of text, a cube, a cylinder, a sphere, or another geometric shape at least partially surrounding the location of the computing system.

20. A non-transitory memory storing one or more programs, which, when executed by one or more processors of a device with an interface for communicating with a display device and one or more input devices, cause the device to:
present, via the display device, an indication of a private viewing region relative to a location of the computing system;
present, via the display device, graphical content at a first location;
transmit a characterization vector associated with the graphical content to at least one other device for display thereon according to a determination that the first location of the graphical content is outside of the private viewing region;
forgo transmission of the characterization vector associated with the graphical content to the at least one other device according to a determination that the first location of the graphical content is inside of the private viewing region;
detect one or more user inputs, via the one or more input devices, associated with translating the graphical content from the first location to a second location; and
in response to detecting the one or more user inputs:
transmit the characterization vector associated with the graphical content to the at least one other device for display thereon according to a determination that the second location of the graphical content is outside of the private viewing region; and
forgo transmission of the characterization vector associated with the graphical content to the at least one other device according to a determination that the second location of the graphical content is inside of the private viewing region.

21. The non-transitory memory of claim 20, wherein presenting the indication of the private viewing region includes presenting, via the display device, a visualization of the private viewing region at least partially surrounding the location of the computing system.

22. The non-transitory memory of claim 21, wherein the visualization of the private viewing region corresponds to one of text, a cube, a cylinder, a sphere, or another geometric shape at least partially surrounding the location of the computing system.

\* \* \* \* \*